United States Patent
Nikkanen et al.

(10) Patent No.: US 12,108,159 B2
(45) Date of Patent: Oct. 1, 2024

(54) METHOD FOR CAMERA CONTROL, IMAGE SIGNAL PROCESSOR AND DEVICE

(71) Applicant: BEIJING XIAOMI MOBILE SOFTWARE CO., LTD., Beijing (CN)

(72) Inventors: Jarno Nikkanen, Sahalahti (FI); Jiaqi Guo, Tampere (FI)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 211 days.

(21) Appl. No.: 17/855,394

(22) Filed: Jun. 30, 2022

(65) Prior Publication Data

US 2023/0058934 A1 Feb. 23, 2023

(30) Foreign Application Priority Data

Aug. 20, 2021 (EP) .................................... 21192389

(51) Int. Cl.
| | |
|---|---|
| *H04N 23/71* | (2023.01) |
| *G06T 7/55* | (2017.01) |
| *G06T 7/70* | (2017.01) |
| *G06V 20/40* | (2022.01) |
| *H04N 5/77* | (2006.01) |

(52) U.S. Cl.
CPC .............. *H04N 23/71* (2023.01); *G06T 7/55* (2017.01); *G06T 7/70* (2017.01); *G06V 20/41* (2022.01); *G06V 20/46* (2022.01); *H04N 5/77* (2013.01); *G06T 2207/10016* (2013.01); *G06T 2207/10024* (2013.01); *G06T 2207/30244* (2013.01)

(58) Field of Classification Search
CPC ... G06T 2207/20221; G06T 3/40; G06T 5/50; G06T 7/70; G06T 7/55; H04N 5/23293; H04N 23/71
See application file for complete search history.

(56) References Cited

U.S. PATENT DOCUMENTS

2017/0256040 A1* 9/2017 Grauer ................. H04N 23/631

* cited by examiner

*Primary Examiner* — Xi Wang
(74) *Attorney, Agent, or Firm* — Arch & Lake LLP; Hao Tan; Zhangyuan Ji

(57) ABSTRACT

Method and device are provided for camera control to acquire an image. The method includes: acquiring a stream of image frames by an image sensor comprising at least one frame; acquiring a target frame by the image sensor; determining scene information in the target frame; selecting a reference frame from the stream of image frames by identifying the scene information of the target frame in the reference frame; determining at least one acquisition parameter of the reference frame; and acquiring a final image from the target frame with the acquisition parameters.

20 Claims, 5 Drawing Sheets ically, there can be inconsistency in color and brightness reproduction between different frames of the same scene, which leads to worse image and video quality and worse user experience.

METHOD FOR CAMERA CONTROL, IMAGE SIGNAL PROCESSOR AND DEVICE

CROSS-REFERENCE TO RELATED APPLICATION

This application is based upon and claims priority to European Patent Application No. 21192389.1, filed Aug. 20, 2021, the entire contents of which are incorporated herein by reference for all purposes.

TECHNICAL FIELD

The present disclosure relates to electronic devices and a method to control such electronic device. More particularly, the present disclosure relates to a method for camera control to acquire an image and an image signal processor (ISP) implementing such method. Further, the present disclosure relates to a device implementing such method.

BACKGROUND

In the current existing camera systems, some framings of a scene are difficult and implemented algorithm for auto white balancing (AWB), automatic exposure control (AEC) and tone mapping (TM) may generate unsatisfying results. Especially if there is only one color or only a limited number of different colors visible in the frame, AWB can fail to reach a correct illumination estimate, and AEC/TM can fail to estimate the real brightness of the object correctly. Consequently, there can be inconsistency in color and brightness reproduction between different frames of the same scene, which leads to worse image and video quality and worse user experience.

This issue of different framings of the same scene having different color and/or brightness reproduction is still present in all digital camera devices. The most common handling of temporal stability still relies on straightforward temporal filtering of the acquisition parameters of the AWB/AEC/TM algorithm by using e.g. trimmed mean or other similar filters across algorithm results for multiple frames, which ensures smooth transitions between acquisition parameters of subsequent frames, but does not ensure that the same object under the same illumination will be always reproduced consistently.

To solve this problem, more information about the scene should be utilized than only the current camera frame. One possibility is temporal filtering of consecutive AWB and/or AEC/TM results. This results in smooth transitions between each of the subsequent frames, but does not prevent convergence into wrong parameters. So, it does not solve the presented problem.

Thus, it is an object of the present disclosure to improve the consistency and accuracy of color and brightness reproduction of images and videos in automatic white balancing (AWB), automatic exposure control (AEC), and tone-mapping (TM) algorithms.

SUMMARY

In a first aspect of the present disclosure a method for camera control is provided to acquire an image. The method may include following steps: acquiring a stream of image frames by an image sensor comprising at least one frame; acquiring a target frame by the image sensor; determining scene information of the target frame; selecting at least one reference frame from the stream of image frames by identifying the scene information of the target frame in the reference frame; determining at least one acquisition parameter of the reference frame; and determining a final image from the target frame by the at least one acquisition parameter.

In an aspect of the present disclosure an image signal processor (ISP) is provided. The ISP is configured to perform the steps of the method described before.

In an aspect of the present disclosure a camera device is provided. The camera device comprises an image sensor, a processor and a memory storage storing instruction which when executed by the processor perform the steps of the method described above.

BRIEF DESCRIPTION OF THE DRAWINGS

The present disclosure is described in more detail with reference to accompanying figures.

DETAILED DESCRIPTION

Figure 1:
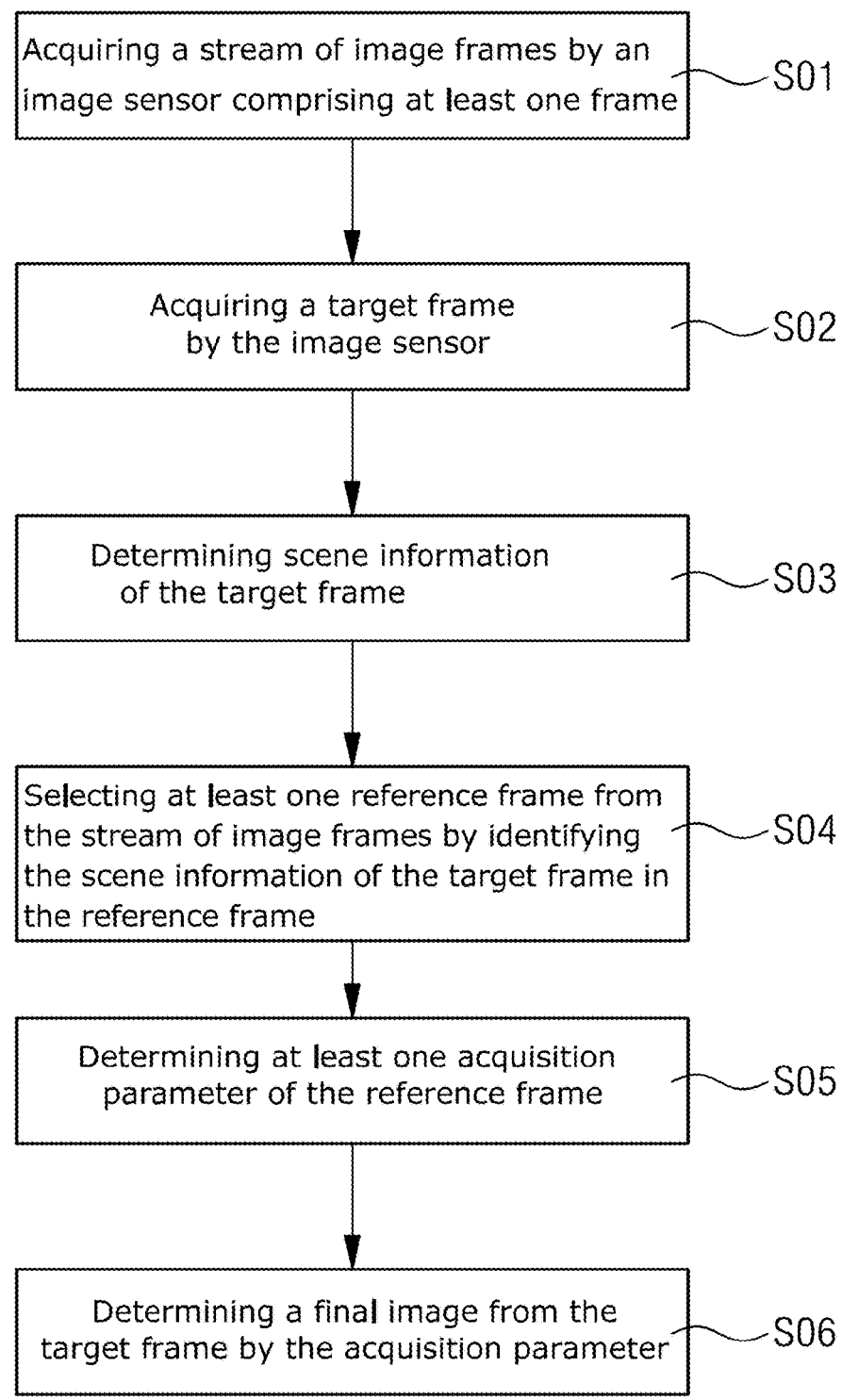
FIG. 1 shows a flow diagram of a method according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function. The present disclosure is related to a camera control to improve the consistency and accuracy of color and brightness reproduction of images and videos in particular during automatic white balancing (AWB), automatic exposure control (AEC) and tone-mapping (TM) algorithms.

In some embodiments, the method according to the present disclosure is implemented in a camera module of a terminal such as a smartphone, tablet or the like. In some embodiments, the camera module is connected to a processing module for performing the steps of the disclosure. The processing module may include a processor such as an Image Signal Processor (ISP) or the like. However, the present disclosure is not restricted to a certain kind of terminals or any specific implementation.

In a first aspect of the present disclosure a method for camera control is provided to acquire an image. The method may include the following steps:

acquiring a stream of image frames by an image sensor comprising at least one frame;

acquiring a target frame by the image sensor;

determining scene information of the target frame;

selecting at least one reference frame from the stream of image frames by identifying the scene information of the target frame in the reference frame;

determining at least one acquisition parameter of the reference frame; and determining a final image from the target frame by the at least one acquisition parameter.

Thus, in accordance with the present disclosure, a stream of image frames is acquired by an image sensor of the camera comprising at least one frame. In some embodiments, the stream of image frames includes a plurality of subsequent frames. In particular, the stream of image frames may be used as preview of the camera or may be part of a video stream.

Subsequently, a target frame is acquired by the image sensor wherein selection of the target frame may be performed by user interaction such as pushing a trigger button to start recording a video or acquiring an image or is the next image of the video stream or is a frame of a preview operation. Thus, the target frame is the raw data of the image intended by the user to be captured or displayed to the user in a preview.

Subsequently, scene information of the target frame is determined. Therein, the scene information can be related to the whole target frame or any real-world object in the target frame. Therein, the object encompasses shapes, surfaces and structures that can be used to be identified in the stream of image frames and may contain multiple whole objects and some partially visible objects, or it could contain only part of one object. Further, scene information can be determined for parts of the target frame or for the complete target frame. Similarly, in order to identify the scene information in the respective image frame of the stream of image frames, scene information of a part of the image frame or of the complete image frame can be determined to identify match of the scene information.

Afterwards at least one reference frame is selected from the stream of image frames by identifying the scene information of the target frame in the reference frame. Each frame of the stream of image frames is checked whether there is at least a partial match of the corresponding scene information of the target in the respective image frame. Thus, the image frames of the stream of image frames are checked for coinciding scene information. In particular, the target frame content can be compared by the scene information against the earlier frames as a whole, to see how much of the current frame contents is visible in the earlier frames, without segmenting the target frame contents into objects and then comparing object by object. If the scene information can be identified in one of the frames of the stream of image frames, this frame of the stream of image frames is selected and taken as reference frame. Therein, the method is consecutively going through the image frames of the stream of image frames to identify the respective scene information and select the reference frame. Alternatively, only those image frames are checked which potentially provide improvement to the acquisition accuracy and consistency.

From the reference frame at least one or more acquisition parameter are determined and the final image is determined from the target frame by use of the determined acquisition parameter. Therein, the acquisition parameter may relate to an auto white balancing (AWB), automatic exposure control (AEC) and/or tone-mapping (TM) parameter.

Thus, by the present disclosure the acquisition parameter of an image frame acquired before capturing the target frame are used in order to increase the consistency and accuracy of color and brightness reproduction of images and videos. Thus, by the present disclosure more information about the scene in which the camera is operated is used from the previously acquired image frames.

In some embodiments, scene information may include localization information, for the image frame of the stream of image frames and the target frame, e.g. simultaneous localization and mapping (SLAM) data. Thus, by utilizing the SLAM data the camera can easily determine whether there is a match of the scene information by overlap of the SLAM data. Therein, by the SLAM data for example the presence of an object of the target frame which is also present in one of the image frames of the stream of image frames can be determined. Thus, on the basis of the acquired SLAM data, selecting of the reference frame can be performed. Therein, SLAM data can be acquired for a part of the target frame or the complete target frame. Similarly, SLAM data can be acquired for each of the complete image frame or only parts of the respective image frame. By using the SLAM data it is not necessary to use a very large amount of annotated ground-truth data for training any object recognition, thereby reducing the cost for accumulating a high quality training data. Further, by use of the SLAM data, the present disclosure is not limited to identification of specific and previously trained objects. In particular, by using the SLAM data the method is independent of the respective object which can be any object of the real-world, specific structures, surfaces or shapes which are localized and mapped by the SLAM process. Further, most modern terminals, such as smartphones, tablets or the like, already have SLAM modules implemented, such that the information provided by the SLAM module can be used for identification of the target frame in the present disclosure.

In some embodiments, the scene information includes depth information or odometry information of the image frame and/or the target frame. Alternatively or additionally, scene information includes a pose of the image sensor, i.e. the camera. Thus, in some embodiments, the camera includes one or more of an inertial motion unit (IMU) such as an acceleration sensor, a gyroscope or the like in order to be able to acquire the pose of the camera. Therein, the depth information of the object may be provided by stereo camera measurement, LIDAR or the like. Therein, pose and depth information/odometry information may also be included in the SLAM data.

In some embodiments, selecting a reference frame from the stream of image frames by identifying the scene information of the target frame in the reference frame includes determining an at least partial overlap of the image frame from the stream of image frames with the target frame by the scene information. Thus, by matching the scene information of the target frame and the respective image frame, partial overlap of the scene contents of the target frame and the image frame is determined in order to make sure that use of the at least one acquisition parameter of the selected reference frame to determine the final image is applicable. Thus, by the at least partial overlap, objects present and visible in the target frame are also at least partially present and visible in the respective image frame when the scene information of the target frame coincides with the scene information of the image frame of the stream of image frames.

In some embodiments, scene information include coordinates of the scene and an object of the scene. Selecting the reference frame from the stream of images by identifying the scene information of the target frame includes calculating coordinates of the scene and determining overlap with coordinates of the respective image frame of the stream of image frames. Thus, if there is a sufficient overlap between the scene of the target frame and the respective image frame according to the calculated coordinates, the image frame can be selected as reference frame. Therein, if coordinates of an object are used, the object can be any real-world object, such as shapes, structures, surfaces or the like. The object may be further several real-world objects or parts thereof, only one real-world object or a part thereof. Therein, SLAM data and/or depth information and/or the pose of the image sensor are used in order to calculate the coordinates of the scene or object in the scene. Therein, the coordinates are calculated in a world coordinate system to be able to be compared between the individual frames and also if the camera is moving or the pose of the camera is changing.

In some embodiments, calculating the coordinates of the scene or object of the scene includes:
acquiring depth information d for pixels (u,v) in the respective image frame and/or the target frame;
determining coordinates in the camera system ($X_{cam}$, $Y_{cam}$, d, 1) by $X_{cam} = (u \times 4 - px) \times d \div cx$, and $Y_{cam} = (v \times 4 + 60 - py) \times d \div cy$, with (px, py) being the principal point of the image sensor, (cx, cy) being the focal length; and transferring the coordinates to the world coordinate system by $$\begin{pmatrix} X \\ Y \\ Z \\ 1 \end{pmatrix} = (R|t) \cdot \begin{pmatrix} X_{cam} \\ Y_{cam} \\ d \\ 1 \end{pmatrix},$$

with (X, Y, Z, 1) being the coordinates in the world coordinate system and (R|t) the pose of the image sensor.

In some embodiments, cx=cy.

In some embodiments, the coordinates of the target frame provided in the world coordinate system are compared with the coordinates of each image frame in the stream of image frames also in the world coordinate system subsequently to determine the partial overlap with the target frame.

In some embodiments, selecting the reference frame includes determining a confidence level of the respect frame for the acquisition parameter and selecting the reference frame if the confidence level is above a preset threshold. Thus, by the confidence level a measure is provided whether the determined at least one or more acquisition parameters of the respective image frame are suitable to be used in order to determine the final image. Only if the confidence level is high enough, i.e. above a preset threshold, the image frame of the stream of image frames is selected as reference image. In particular, the confidence level of the respective image frame to be selected as reference frame needs to be above the confidence level of the target frame in order to provide an improvement of consistency and accuracy of color and brightness reproduction of the image. In particular, if in the stream of image frames no image frame can be found having a confidence level being above the preset threshold the acquisition parameters are determined from the target frame itself.

In some embodiments, the reference frame is selected by the maximum of overlap between the respective image frame of the stream of image frames and the target frame and the confidence level of the respective image frame of the stream of image frames. Thus, an optimum of color and brightness consistency and accuracy can be achieved.

In some embodiments, the confidence value is determined by one or more of a color gamut in particular for AWB, brightness gamut for AEC and/or TM, a hull of the 2D chromaticity for AWB, 1D brightness range for AEC and/or TM, or 3D color histogram for AWB and/or AEC and/or TM. If SLAM data is used to make a rough model about the scene in which the camera is operated, then AWB/AEC/TM parameters from image frames having a higher confidence level can be used to correct the acquisition parameters that result for target frames having a lower confidence level, hence increasing the consistency and accuracy of color and brightness reproduction.

In some embodiments, the image frame from the stream of image frames comprises low resolution images having a resolution lower than the final image and in particular a resolution smaller than 640×480 pixel, more particularly a resolution smaller than 320×240 pixel and even a resolution smaller than 64×48 pixel. Thus, the image frames from the stream of image frames can be easily stored and processed without increase of computational demands on the device.

In some embodiments, the image frames of the stream of image frames are stored in a memory of the camera for subsequent use to determine the acquisition parameters. In particular, if the image frames from the stream of image frames provides low resolution images, the image frames can be easily stored without excessive memory consumption. In particular, only the image frames of the stream of image frames may be stored having a confidence level above a preset threshold. Thus, only those image frames are stored which can be used as reference images while the other image frames of the stream of image frames are disregarded in order to further reduce the demands on memory.

In some embodiments, the camera pose is stored together with the stored image frames of the stream of image frames. Thus, by the pose the coordinates of the object in the respective image frames can be calculated. Further information may be stored together with the image frames of the stream of image frames such as focal length, principal point and depth information.

In some embodiments, the method further comprises: detecting change of illumination between the reference frame and the target frame and adapting the reference frame to the changed illumination before determining the acquisition parameter.

In some embodiments, more than one reference frames are selected wherein the at least one acquisition parameter is determined from the more than one reference frame for example by averaging. In particular, weighted averaging can be used, wherein the acquisition parameter of the more than one reference frame are weighted by their respective confidence value.

In some embodiments, the steps of the method are iteratively repeated for every new target frame of a video stream or a stream of preview-images.

In an aspect of the present disclosure an image signal processor (ISP) is provided. The ISP is configured to perform the steps of the method described before. In some embodiments, the ISP is connectable to an image sensor to receive image data or image frames. Further, the IPS may be connectable to a SLAM module of a device implementing the ISP which may be a terminal or the like.

In an aspect of the present disclosure a camera device is provided. In some embodiments, the camera device is implemented in a mobile terminal. The camera device comprises an image sensor, a processor and a memory storage storing instruction which when executed by the processor perform the steps of the method described above.

In some embodiments the camera device comprises a SLAM module to acquire SLAM data to identify the reference frame.

Referring to FIG. 1, showing the method for camera control to acquire an image.

In step S01, a stream of image frames is acquired by an image sensor, wherein the stream of image frames comprises at least one frame.

Thus, a stream of image frames is acquired by an image sensor of the camera comprising at least one frame and optionally a plurality of subsequent frames. In particular, the stream of image frames may be used as preview of the camera or is part of a video stream captured. In particular, the image frames of the stream of image frames have a low resolution than 640×480 pixel. In some embodiments, the image frames of the stream of image frames have a resolution smaller than 320×240 pixel.

In some embodiments, the image frames of the stream of image frames have a resolution smaller than 64×48 pixel. Alternatively, the image frames are 3A statistics instead of original raw frames in order to reduce memory consumption, for example a 2D RGB grid that represents linearized raw camera RGB image frame.

In step S02, a target frame is acquired by the image sensor.

Therein, selection of the target frame may be performed by user interaction such as pushing a trigger button to start recording a video or acquiring an image. Alternatively, the target frame is determined by the next frame of a video stream to be captured or the next frame of a preview. Thus, the target frame is the raw data of the image intended by the user to be captured.

In step S03, scene information of the target frame is determined by the processing module or ISP.

Therein, scene information includes any information about the scene of the target frame. Scene information can be determined for parts of the target frame or for the complete target frame. Similarly, in order to identify the scene information in the respective image frame of the stream of image frames, scene information of a part of the image frame or of the complete image frame can be determined to identify match of the scene information.

In step S04 a reference frame is selected from the stream of image frames by identifying the scene information of the target frame in the reference frame by the processing module or ISP.

Each frame of the stream of image frames is checked whether there is at least a partial overlap between the scene information of the target frame and the respective image frame whether scene content of the target frame is partially or completely present in the respective image frame. Alternatively, only those image frames are checked which potentially provide improvement to the acquisition accuracy and consistency. If the scene information can be identified in one of the frames of the stream of image frames, this frame of the stream of image frames is selected and taken as reference frame. Therein, the method is consecutively going through the image frames of the stream of image frames to identify the respective scene information and select the reference frame. Thus, overlap between the target frame and the respective image frame of the stream of image frames is determined by the scene information to identify a possible reference frame to be selected if sufficient overlap is determined.

In Step S05 at least one acquisition parameter of the reference frame is determined by the processing module or ISP. Therein the at least one acquisition parameter may be an auto white balancing (AWB), automatic exposure control (AEC) and/or tone-mapping (TM) parameter determined from the reference frame.

In some embodiments, more than one reference frames are selected wherein the at least acquisition parameter is determined from the more than one reference frame for example by averaging. In particular, all reference frames that have match score above certain level can be selected. In particular, weighted averaging can be used, wherein the acquisition parameter of the more than one reference frame are weighted by their respective confidence value. Thus, more information from previous frames can be used to determine the acquisition parameter of the target frame providing a more reliable result.

In step S06 a final image is determined from the target frame by the at least one acquisition parameters by the processing module or ISP.

Therein, the target frame contains raw data and as soon as the respective acquisition parameter is determined, the raw data of the target stream is determined by use of the one or more acquisition parameter from the reference frame.

Thus, by the present disclosure the acquisition parameters of an image frame acquired before capturing the target frame are used in order to increase the consistency and accuracy of color and brightness reproduction of images and videos. Thus, by the present disclosure more information about the scene in which the camera is operated is used from the previously acquired image frames.

In step S04 localization information and optionally SLAM data may be used as scene information to make a rough model about the scene in which the camera is operated in order to determine the reference frame including at least partially the same scene contents as the target frame. Then AWB/AEC/TM parameters from frames having a higher confidence level can be used to correct the parameters that result for the target frame having a lower confidence level, hence increasing the consistency and accuracy of color and brightness reproduction. Thus, by utilizing the SLAM data, the camera can easily determine whether scene information of the target frame is also present in one of the image frames of the stream of image frames if there is at least a partial overlap in the scene content between the respective image frame and the target frame. Thus, on the basis of the acquired SLAM data, selecting of the reference frame can be performed. In particular, by using the SLAM data as scene information the method is independent of a respective object to be recognized and any object of the real-world, such as structures, surfaces or shapes which are localized and mapped by the SLAM process can be used to determine overlap between the target frame and the respective image frame. Further, most modern terminals, such as smartphones, tablets or the like, already have SLAM modules implemented, such that the information provided by the SLAM module can be used for identification of the target frame in the present disclosure.

Therein, the method can be implemented in an iterative process and repeated for each new target frame being a frame of a video stream or a preview, thereby continuously improving the image reproduction.

Figure 2:
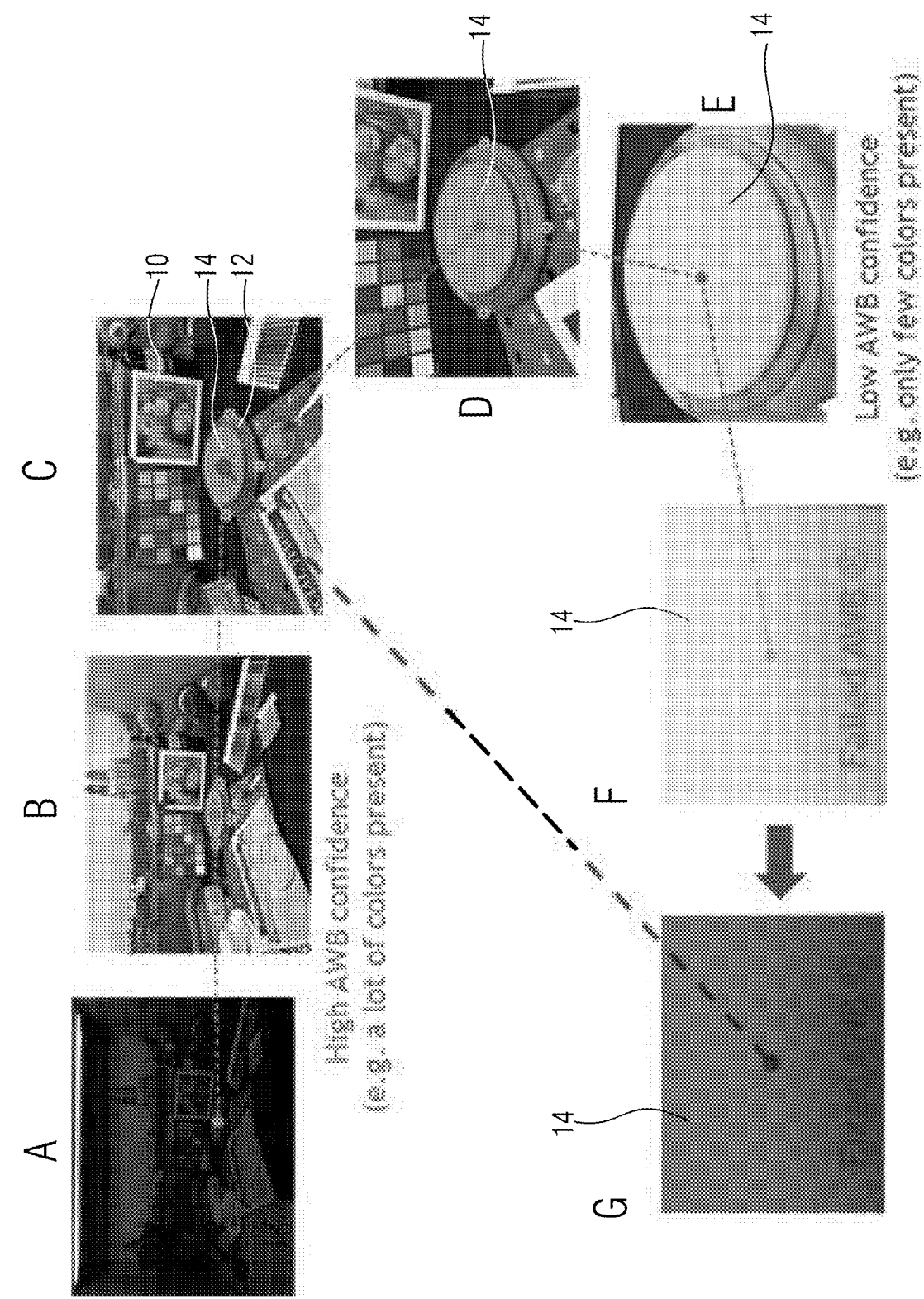
FIG. 2 shows example images of the steps of the method according to some embodiments of the present disclosure.

Referring to FIG. 2 showing the steps in order to acquire a final image. Therein, FIG. 2 refers to the implementation for an AWB algorithm. However, the present method can alternatively or at the same time also implemented in AEC or TM algorithm as mentioned above.

In picture A an initial image is acquired wherein by an auto white balancing algorithm acquisition parameters related to the AWB is determined for the initial image and applied in picture B to achieve correctly adjusted picture. Therein, by a SLAM algorithm simultaneously localization and mapping of the content of the picture B is performed and for the scene of the respective image frame a point cloud is determined as scene information. These steps are repeated for each image frame of the stream of image frames including the pictures A to E of FIG. 2.

Picture C shows a closer look of the respective objects in the scene by moving camera closer to the object 14 or by zooming in. Therein, object 14 is present in both image frames B and C, wherein points 14 of the point cloud mark the object 14. Similarly, by other points 10 of the point cloud other objects are detected.

Picture D shows the same object 14 even closer thereby reducing the color gamut of the image. Picture E only contains the object 14 and almost all color information is drawn directly from the object 14 itself leading to a low color gamut to be used as information for determining the respective AWB parameter of picture E. As clearly visible in the comparison between pictures B-D and E and shown in detail in pictures F and G, the AWB algorithm may fail resulting in wrong colors of the object 14 as shown in picture F.

In picture B of FIG. 2 the image has a high color gamut and thus a high confidence level can be achieved for the acquisition parameters related to the AWB parameters. Further, the target frame shown in picture E has full overlap with the content of picture B since both show the object 14.

Thus, by the method of the present disclosure, the scene information of picture E including object 14 is identified subsequently in each of the images D, C and B in reversed order of acquisition until a picture is reached having a high confidence level regarding the AWB parameter and still have an overlap in the scene content, i.e. showing the object 14. Therein, it would not be necessary that the image frame includes object 14 completely but also partial overlap of the scene content between the target frame of picture E and the possible reference frame may be sufficient to improve color reproduction. Further, the present method is not limited to specific objects and any object as scene content can be used as scene information, such as surfaces, shapes, structures or the like. Although FIG. 2 showing as an example object 14, other objects or parts of objects are also possible. This comparison and identification of overlap by the scene information between the image frames in the plurality of image frames B-D and the target frame E is performed by acquiring SLAM data as scene information for each of the pictures B to E. Thereby, the SLAM data of object 14 can be identified by the world coordinates of the object 14 determined by the SLAM algorithm in the other frames in order to determine overlap. Thus, in the example of FIG. 2, picture C is used as reference frame and the AWB parameters determined for the picture C are also used for the AWB of picture E leading to picture E having a corrected AWB and producing correct colors thereby improving color consistency and accuracy for the object 14. The corrected AWB produces a result shown in picture G of FIG. 2 having the correct color and not suffering from the reduced color information provided by the picture E itself.

Figure 3:
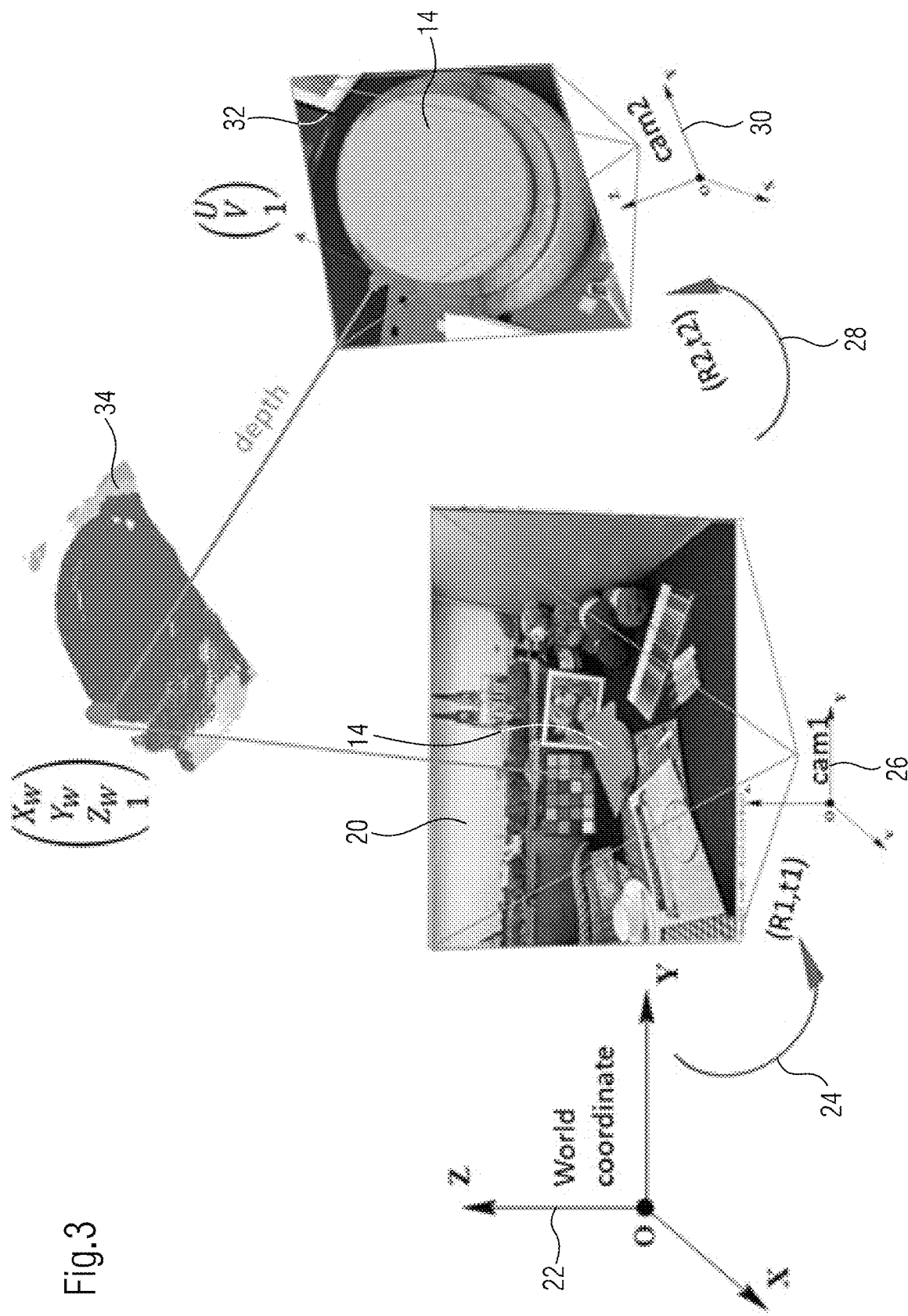
FIG. 3 shows detailed illustration of a step of the method according to some embodiments of the present disclosure.

The steps for determining the coordinates of the scene or an object within the scene of the target frame and the respective image frames is illustrated in FIG. 3. FIG. 3 shows a world coordinate system 22. In a first step, upon acquiring a frame 20 of a stream of image frames which may be used as reference frame, by the acquired depth information or odometry information, coordinates of the object 14 in the image frame 20 can be determined in the camera coordinate system 26 of camera in a first state/position denoted by "cam1". By the pose (R1, t1) of the camera "cam1" and the coordinates of the object 14 in the camera coordinate system 26 of "cam1", coordinates of the object 14 in the world coordinate system 22 can be determined. Therein, it is not necessary to have a real-world object as exemplified in FIG. 3. Instead, any object, surface, shape or structure can be used and coordinates can be determined to determine overlap between target frame and respective image frame. Further, coordinates of a plurality of objects present in the scene, parts of a plurality of object in the scene or part of only one object in the scene can be used in order to determine overlap between the target frame and the respective image frame.

Similar for the target frame 32 according to the depth information provided by a 3D point cloud 34 of the camera in the camera state denoted by "cam2", the coordinates of the object 14 in the target frame 32 can be determined in the camera coordinate system 30 of "cam2". By the pose (R2, t2) of the camera "cam2" and the coordinates of the object 14 in the camera coordinate system 30 of "cam2", coordinates of the object 14 in the world coordinate system 22 can be determined. Thus, overlap between the target frame 32 and the frame 20 can be determined. Therein, in the example of FIG. 3, overlap is determined by of a set of the 3D point of the 3D point cloud 34 in the world coordinate system that are visible in both target and reference frame, and there is no distinction done regarding which object(s) these points belong to. The 3D point cloud may be determined from the depth information, the camera position and/or camera orientation information (camera pose) as exemplified in more detail below.

Alternatively, only the coordinates of the object 14 can be determined in the world coordinate system for the target frame 32 of "cam2". The 3D point cloud 34 of the target frame 32 is available in the world coordinate system. Depth information/map, camera position and/or camera pose from target frame 32 was used to construct this 3D point cloud 34. For image frame 20, the distance of the camera at camera state "cam1" from those 3D points based on the camera pose and/or camera position in image frame 20 is determined to determine which area of the image frame 20 covers those 3D points of the 3D point cloud 34. Thus, depth information of the image frame 20 may not be available and only overlap of the scene or object of the reference frame 32 with the image frame 20 is determined without the need to calculate coordinates of the whole image frame 20 in the world coordinate system.

Therein, the coordinates of each pixel in the target frame may be translated into the world coordinate system 22. Alternatively, only for certain points of the target frame coordinates are determines. Similarly, for the respective image frame from the stream of image frames either for each of the pixels coordinates in the world coordinate system are determined, or, alternatively, for a selection of pixels of the respective image frame the coordinates are determined and translated into the world coordinate system 22 in order to identify overlap between the target frame or the object in the target frame and the respective image frame.

Due to the SLAM data acquired for the image frames including at least the depth information, i.e., odometry information, in the stream of image frames, the coordinates of the scene or object 14 of the target frame 32 can be translated into the world coordinate system 22 and can then be compared with the world coordinates of the scene or object 14 of the reference frame 20 in order to determine whether the object 14 is present in the target frame 32 and the reference frame 20. Only if there is an overlap, i.e. the object 14 is at least partially visible in the respective image frame, this frame is considered to be used as reference frame. The acquisition parameters of the determined reference frame are used in order to produce the final image. Therein, for each frame, it is checked if there is at least a partial overlap of the scene with earlier frames. If yes, then it is checked whether the earlier frames have higher confidence level for the acquisition parameters available (separately for AWB, AEC, and TM).

Figure 4:
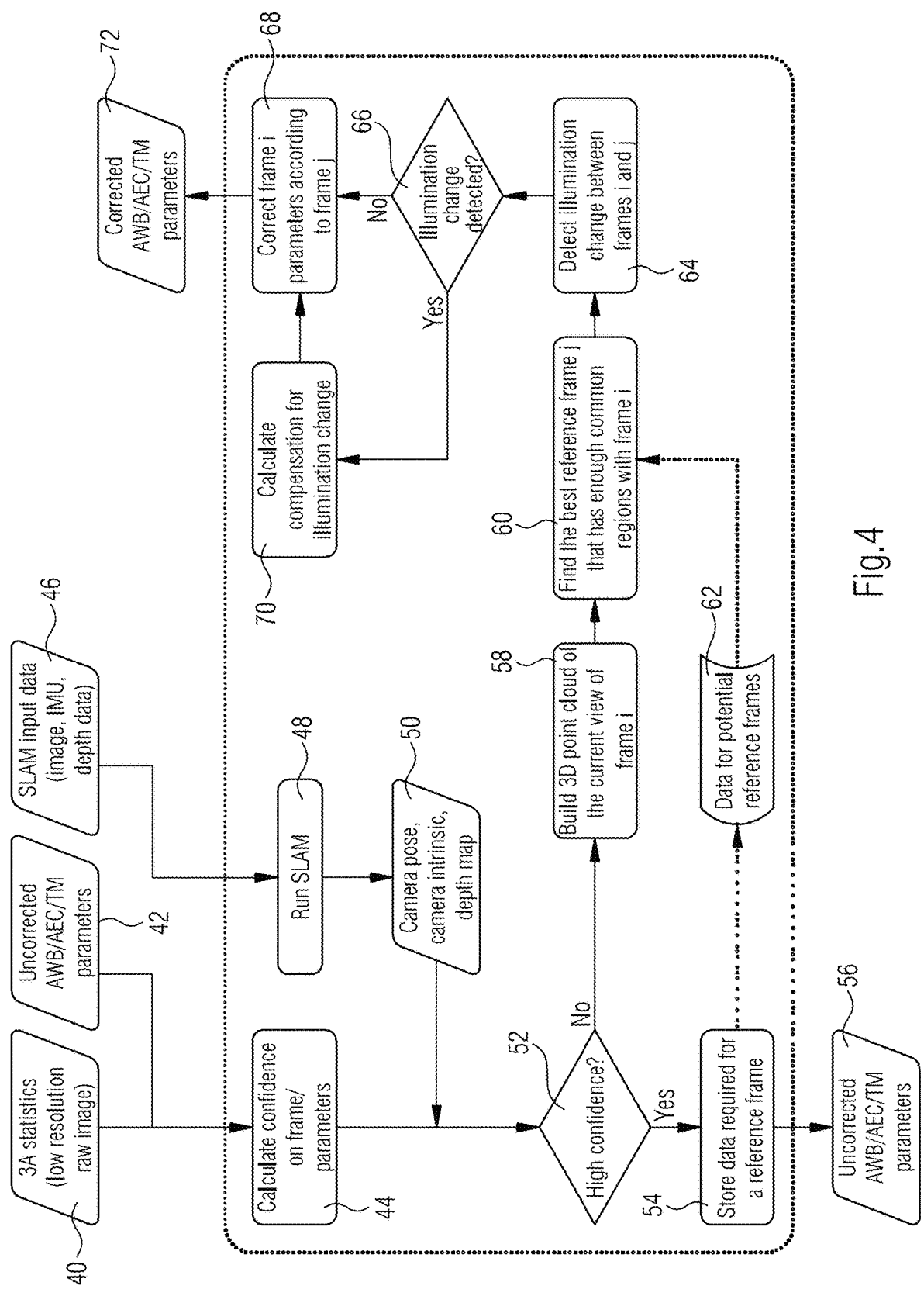
FIG. 4 shows a diagram showing another embodiment of the present disclosure and FIG. 5 shows a camera device according to some embodiments of the present disclosure.

Referring to FIG. 4, the system contains 3 parts in total. The first part is running SLAM 48 on the device by SLAM input data 46 from the image, IMU and depth data for camera pose estimation and scene modelling 50 acquiring a depth map or depth information. During this process, a sequence of image frames is captured and stored 40. The stored frames could be also low resolution 3A statistics instead of original raw frames in order to reduce memory consumption, for example 2D RGB grid that represents linearized raw camera RGB image. Also the corresponding camera pose is stored per each frame, which is a 4×4 matrix, alongside with other image metadata such as camera's focal length (cx, cy), principle point (px, py), and uncorrected algorithm parameters 42 such as AWB gains. The depth data or odometry data will be collected at the same time.

An algorithm confidence value 44 is calculated for each frame; for example, color gamut, convex hull of the 2D chromaticity or 3D color histogram could be used as the confidence metric for AWB/AEC/TM, because more colors visible inside the FOV usually makes the scene easier for AWB and also makes it easier for AEC and TM to estimate the correct brightness of objects in relation to other objects in the scene. The convex hull should be calculated from image data in device independent color space to enable using the same thresholds for high and low confidence for all devices. Higher confidence frames are the potential reference frames that can be utilized for correction of low confidence frames.

A decision 52 is made whether the respective image frame has a high confidence level. If the image frame has a high confidence level, the image frame is stored to be used later as reference frame for a video stream, preview or picture. For the final image of the high confidence frames, the uncorrected AWB/AEC/TM parameter are used to generate the final image.

If in the decision the image frame has a low confidence level for AWB/AEC/TM parameter, the system will retrieve the depth data and construct a depth map or 3D point cloud 58 as scene information. In order to build the 3D points cloud, each pixel (u,v) in the depth map first needs to be transferred into the camera coordinate system by using projective camera intrinsic matrix information as below, $$X_{cam}=(u\times 4-px)\times d\div cx,$$

$$Y_{cam}=(v\times 4+60-py)\times d\div cy,$$

where d is the real depth value from the depth map. After that the 3D points could be obtained by the following equation:

$$\begin{pmatrix} X \\ Y \\ Z \\ 1 \end{pmatrix} = (R|t) \cdot \begin{pmatrix} X_{cam} \\ Y_{cam} \\ d \\ 1 \end{pmatrix},$$

where (R|t) is the estimated camera pose.

The next step is to verify if the target frame i contents has shown in the most recent potential reference frames 60 from the data 62 of all acquired potential reference frames (or any of the high confidence frames that are identified to belong to the same physical space in which the camera is currently operated). The 3D points of the target frame determined before, are projected back to the potential reference frame j by following the steps described above in reverse, and replace the (R|t) with the potential reference frame's camera pose. Frame j is selected as reference frame based on maximizing the proportion of the low confidence frame i that is visible in the reference frame j (c_common_area(i,j)) and maximizing the confidence level that the reference frame j has (c_confidence(j)). According to one embodiment of the disclosure the maximized value is the product c_common_area(i,j)*c_confidence(j), but also other implementations are possible.

Once the reference frame j is selected, the system moves to the third part. AWB is here used as an example algorithm. Automatic White Balancing (AWB) is the camera control algorithm that estimates the chromaticity of the illumination and calculates the White Balancing (WB) RGB gains that enable correct and consistent color reproduction of object colors regardless of the prevailing illumination, hence achieving color constancy. For example, white objects are reproduced as white regardless of the color of the illumination (if chromatic adaptation processing is excluded). The effect of WB on image RGB pixel can be illustrated by $$x' = C \cdot G \cdot x,$$

where x is the 3×1 vector that corresponds to linearized raw camera RGB value, G is the diagonal 3×3 WB RGB gains matrix (the diagonal values are the WB RGB gains), and C is the 3×3 color space conversion matrix to convert from linearized raw camera RGB to device independent linear RGB.

Illumination change between frames i and j detected 64 by comparing the linearized raw pixel RGB average values common_area_avg_rgb(i) and common_area_avg_rgb(j) that belong to the same object surfaces that is visible in both frames, and that have been normalized to eliminate impact from any difference in exposure (both are 3×1 RGB vectors). Therein, each point of the 3D point cloud 34 as shown in FIG. 3 have a corresponding RGB value in both target and reference frame. These are the points from which the "common_area_avg_rgb" are calculated from each frame. If Euclidean distance or other difference metrics diff(common_area_avg_rgb(i), common_area_avg_rgb(j)) is larger than certain threshold common_area_similarity_thr then illumination change is considered to be detected, otherwise the illumination is considered unchanged.

A decision 66 is made whether an illumination change could be detected.

If no illumination change is detected between target frame i and higher confidence reference frame j, then WB gains of frame j can be used for frame i 68 and just regular temporal filtering may be applied on top to ensure smooth parameter changes between frames.

If illumination change is detected, then the higher confidence reference frame j WB RGB gains need to be corrected 70 according to the illumination change before applying on target frame i. The correction factor (3×1 vector) correction_factor=common_area_avg_rgb(j)/common_area_avg_rgb(i) is used as a multiplier for the WB RGB gains of frame j before applying on frame i.

What is described here for AWB may also be applied to AEC or TM. The corrected AWB/AEC/TM parameter determined for the respective reference frame j are used and applied 72 to the target frame to achieve high color accuracy and consistency.

Figure 5:
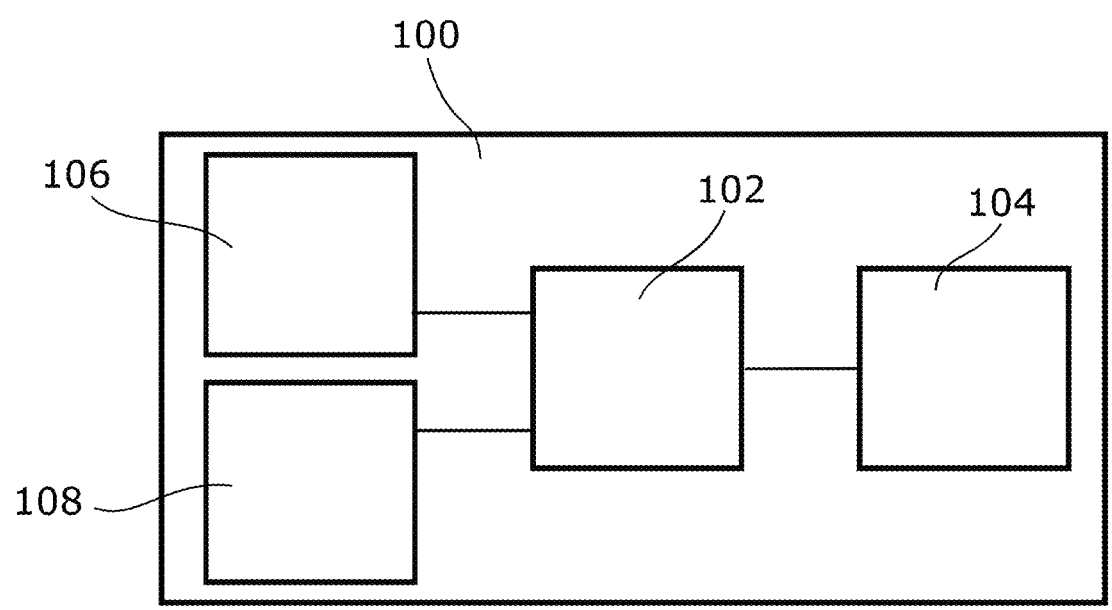

Referring to FIG. 5 showing a camera device 100 being implemented in a terminal such as a smartphone, tablet or the like. The camera device 100 comprises a processor 102 and a memory 104. Therein, the memory 104 stores instructions which when executed by the processor 102 carry out the steps of the method described above. Therein, the camera device 100 may further comprise or is connected to an image sensor to acquire image data to be used in the method of the present disclosure. Further, the camera device may comprise or may be connected to a SLAM module. Therein, the camera device 100 may have an individual SLAM module or a SLAM module is implemented in the terminal device used by the camera device 100. In FIG. 5 for illustration purposes the camera device 100 is shown together with the image sensor 106 and the SLAM module 108 as integrated component of the terminal.

Thus, by using the SLAM data/depth information provided by the SLAM module of the terminal or camera more information about the respective scene can be used and thus scene information can be identified in different frames in order to improve consistency and accuracy of color reproduction the acquisition parameters of frames having a higher confidence level are used.

What is claimed is:

1. A method for camera control to acquire an image, comprising:
   acquiring a stream of image frames by an image sensor comprising at least one frame;
   acquiring a target frame by the image sensor;
   determining scene information of the target frame;
   selecting at least one reference frame from the stream of image frames by identifying the scene information of the target frame in the reference frame;
   determining at least one acquisition parameter of the reference frame; and
   determining a final image from the target frame by correcting at least one corresponding acquisition parameter of the target frame using the at least one acquisition parameter of the reference frame,
   wherein the scene information comprises simultaneous localization and mapping (SLAM) data for the image frame of the stream of image frames and the target frame.

2. The method according to claim 1, wherein acquisition parameter is related to at least one of an auto white balancing (AWB), automatic exposure control (AEC) or tone-mapping (TM) parameter.

3. The method according to claim 1, wherein the scene information comprises depth information of the image frame and/or the target frame and/or pose of the image sensor.

4. The method according to claim 1, wherein selecting a reference frame from the stream of image frames by identifying the scene information of the target frame in the reference frame comprises determining an at least partial overlap of the image frame from the stream of image frames with the target frame by the scene information.

5. The method according to claim 4, wherein scene information comprise coordinates of the scene, and wherein selecting a reference frame from the stream of images by identifying the scene information of the target frame comprises calculating coordinates of the target frame and determining an at least partial overlap with coordinates in the respective image frames of the stream of image frames.

6. The method according to claim 5, wherein calculating coordinates of the scene comprises:
   acquiring depth information d for pixel in the frame (u, v, 0);
   determining coordinates in the camera system ($X_{cam}$, $Y_{cam}$, d, 1) by $$X_{cam} = (u \times 4 - px) \times d \div cx, \text{ and}$$

$$Y_{cam} = (v \times 4 + 60 - py) \times d \div cy,$$

with (px, py) being the principal point of the image sensor, (cx, cy) being the focal length; and
   transferring the coordinates to the world coordinate system by $$\begin{pmatrix} X \\ Y \\ Z \\ 1 \end{pmatrix} = (R|t) \cdot \begin{pmatrix} X_{cam} \\ Y_{cam} \\ d \\ 1 \end{pmatrix},$$

with (X, Y, Z, 1) being the coordinates in the world coordinate system and (R|t) the pose of the image sensor.

7. The method according to claim 6, comprising comparing the coordinates in the world coordinate system of the object in the target frame with each image frame from the stream to determine the at least partial overlap.

8. The method according to claim 1, wherein selecting a reference frame comprises determining a confidence level of the respective frame for the acquisition parameter and selecting the reference frame if the confidence level is above a preset threshold.

9. The method according to claim 1, wherein the reference frame is selected by the maximum of overlap and confidence value of the respective image frame of the stream of image frames.

10. The method according to claim 9, wherein the confidence value is provided by one or more of color gamut, brightness gamut, a hull of the 2D chromaticity, 1D brightness range, or 3D color histogram.

11. The method according to claim 1, wherein the image frames from the stream of image frames comprises low resolution images having a resolution lower than the final image or 3A statistics of the raw image frame.

12. The method according to claim 1, wherein the image frames of the stream of image frames are stored.

13. The method according to claim 1, wherein image frames of the stream of image frames are stored having a confidence level above a preset threshold.

14. The method according to claim 12, wherein camera pose is stored together with the stored image frames of the stream of image frames.

15. The method according to claim 1, wherein the method further comprises:
 detecting change of illumination between the reference frame and the target frame and adapting the reference frame to the changed illumination before determining the acquisition parameter.

16. The method according to claim 1, wherein steps of the method are repeated for every new target frame of a video stream or a stream of preview-images.

17. An image signal processor (ISP), configured to:
 acquire a stream of image frames by an image sensor comprising at least one frame;
 acquire a target frame by the image sensor;
 determine scene information of the target frame;
 select at least one reference frame from the stream of image frames by identifying the scene information of the target frame in the reference frame;
 determine at least one acquisition parameter of the reference frame; and
 determine a final image from the target frame by correcting at least one corresponding acquisition parameter of the target frame using the at least one acquisition parameter of the reference frame,
 wherein the scene information comprises simultaneous localization and mapping (SLAM) data for the image frame of the stream of image frames and the target frame.

18. The ISP according to claim 17, wherein acquisition parameter is related to at least one of an auto white balancing (AWB), automatic exposure control (AEC) or tone-mapping (TM) parameter.

19. A camera device comprising: a processor and a non-transitory memory storage storing instruction, when executed by the processor, causing the processor to perform acts comprising:
 acquiring a stream of image frames by an image sensor comprising at least one frame;
 acquiring a target frame by the image sensor;
 determining scene information of the target frame;
 selecting at least one reference frame from the stream of image frames by identifying the scene information of the target frame in the reference frame;
 determining at least one acquisition parameter of the reference frame; and
 determining a final image from the target frame by correcting at least one corresponding acquisition parameter of the target frame using the at least one acquisition parameter of the reference frame,
 wherein the scene information comprises simultaneous localization and mapping (SLAM) data for the image frame of the stream of image frames and the target frame.

20. The camera device according to claim 19, wherein acquisition parameter is related to at least one of an auto white balancing (AWB), automatic exposure control (AEC) or tone-mapping (TM) parameter.

* * * * *